Jan. 15, 1929.
E. L. FONSECA
1,699,104
DISTANT READING TEMPERATURE INDICATING MECHANISM
Filed Aug. 10, 1927
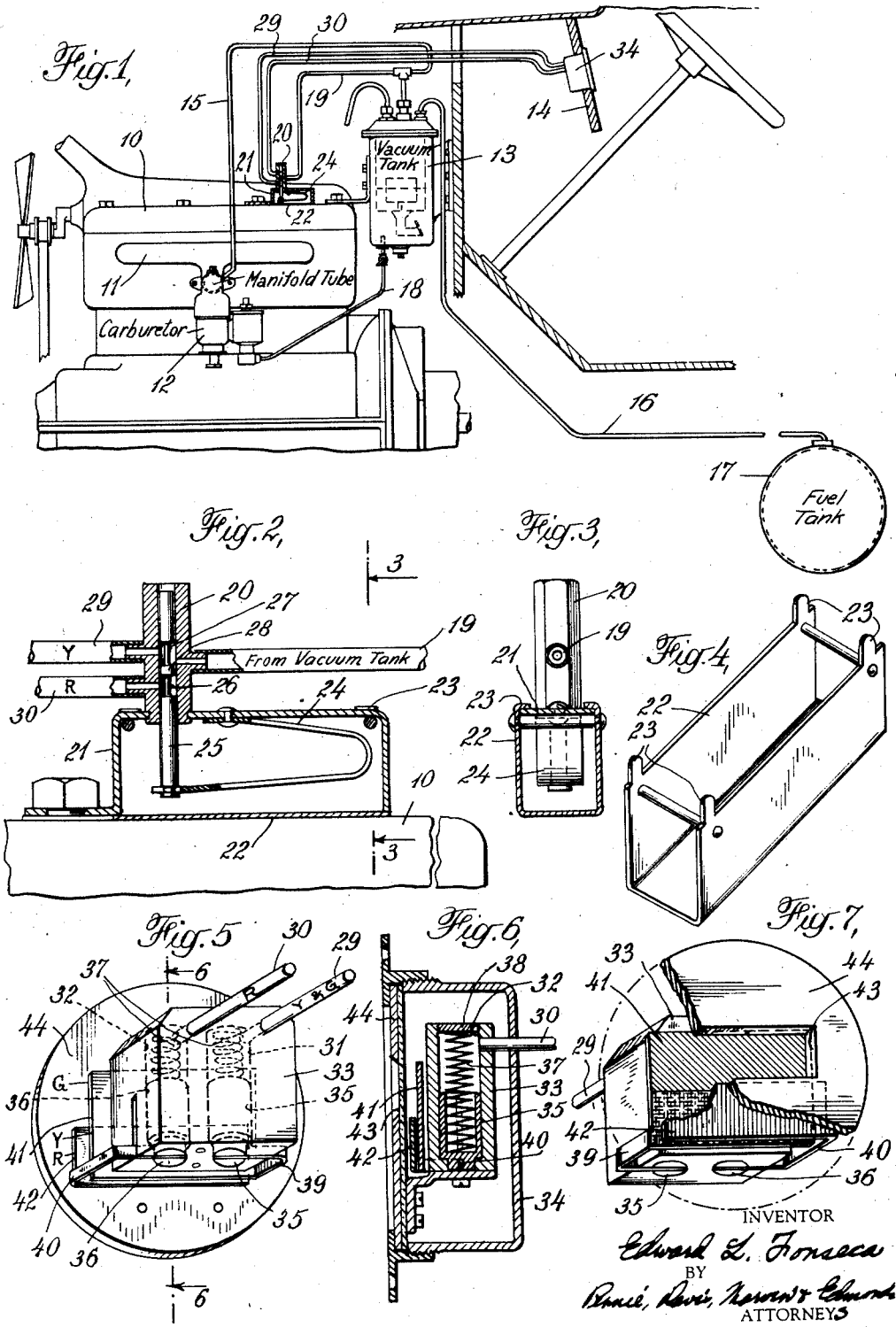

Patented Jan. 15, 1929.

1,699,104

UNITED STATES PATENT OFFICE.

EDWARD L. FONSECA, OF EAST ORANGE, NEW JERSEY, ASSIGNOR TO THE WILCOLATOR COMPANY, OF NEWARK, NEW JERSEY, A CORPORATION OF DELAWARE.

DISTANT-READING TEMPERATURE-INDICATING MECHANISM.

Application filed August 10, 1927. Serial No. 211,982.

This invention relates to thermostatic signalling systems employed for the purpose of transmitting information as to temperature conditions from one point to a point remote therefrom, and is concerned more particularly with mechanism by which visible signals are given at a certain point as the temperature varies at a point remote therefrom. Mechanism of this type is particularly useful in an automobile or similar vehicle for giving signals at the dash relative to the thermal conditions of the motor, and an adaptation of this invention for that purpose will be described, although it is to be understood that the utility of the invention is not limited to that particular usage as it may be as readily adapted to indicating the thermal condition of any other object having a variable temperature.

Heretofore it has been common practice to equip motor cars with temperature indicating means such as a thermometric device connected with the radiator, the dial or liquid column of which is normally visible from the driver's seat. By means of this device the driver is informed as to the temperature of the circulating cooling water and accordingly knows whether the motor is running at the proper temperature or is overheating. If the liquid column moves above a certain fixed point marked on the scale of this device, the driver knows that the motor is operating under abnormal conditions due to insufficient oil or cooling water, so that it requires attention.

While such visible radiator indicators are suitable under ordinary conditions, there are frequent occasions when they are unsatisfactory. For example, the liquid column housings of such instruments may become broken due to shock or excessive vibration so that the liquid therein will remain at a fixed point regardless of the motor temperature. Also the scale may become so obscured by dirt or moisture that the temperature cannot be read from it. In addition to these objections, the radiator indicator is liable to theft and breakage.

It is the principal object of this invention to provide a distant reading temperature indicating mechanism which is simple and positive, operating to give warning signals as predetermined thermal conditions occur in the motor, these signals being indicated in such a way as to immediately attract the operator's attention. While there are various ways in which these warning signals may be given, the preferred manner is by a moving object or objects which may conveniently be a number of strikingly colored screens or portions of a screen which are moved separately into the view of the operator according to the particular thermal condition which each color is adapted to indicate. While as many colors may be provided as may be desired to indicate varying temperatures, in one simple form of the mechanism three colors are used, one of which is in plain view at all times. For example, bright yellow may be used to indicate that the motor is running cold, i. e., its temperature is below that normally necessary to obtain the best and most efficient operation; green may be used when the motor is running warm, i. e., the desirable working temperature which should be maintained at all times; while when red is in indicating position, warning is given the operator that the motor is exceeding a dangerous temperature limit and requires additional cooling water, oil, or other necessary attention. Similarly, warning legends may be used instead of the colors or in conjunction therewith, so that persons unfamiliar with the signals will know what they mean. Such legends may be, "Cold," "Warm" and "Hot" instead of or including the yellow, green and red colors, respectively.

It is well known that a conspicuous movement of some kind attracts attention most readily, and by placing the indicator in a position in the direct view of the operator, such as on the automobile dash or instrument board to which he frequently refers, he will instantly notice any movement of the screens and is thus informed of dangerous conditions in the motor as soon as these conditions arise. Inasmuch as the mechanism of this invention is installed and enclosed within portions of the car, the parts thereof are not liable to damage or theft, and once installed, the mechanism will operate for indefinite periods of time without attention, since under its normal working conditions, i. e., when the engine is running properly and the green or "Warm" signal is showing, no working parts are in play and no operating power is required.

In addition to the indicating means described, a simple embodiment of the invention includes a thermostatic element secured to the motor at some convenient point, such as on the engine block, so that the element is exposed to the heat of the motor.
This element is provided with a moving part, preferably in the form of a valve, which is connected to any convenient source of power such as the vacuum tank, the valve controlling the application of suction in a line connected to the tank. This valve is also connected with the visible indicators, each of which is provided with a piston by which the indicator can be moved. When the temperature to which the thermostatic element is exposed reaches predetermined values, the resultant flexing of the element operates the valve which effects certain selected connections between the indicator pistons and the source of power, e. g., the vacuum tank, whereupon the working factor, such as vacuum, causes a movement of one of the pistons and the attached colored screen to give the proper indication. In the same manner, more or less flexure of the thermostatic element in response to other motor temperatures will establish other connections between the source of power and the indicators to produce other indications accordingly. It is preferred that the source of power be disconnected from the indicating means when the motor is operating properly, which, under normal operating conditions, should be most of the time. In this manner the durability of the mechanism is increased and under normal operating conditions no power is absorbed by it. When the motor is not operating the indicating mechanism is also inoperative.

For a better understanding of the invention, reference is made to the accompanying drawings, in which Figure 1 is a left side elevation of an automobile motor, showing the application of a preferred embodiment of this invention;

Fig. 2 is an enlarged section of the temperature-responsive mechanism;

Fig. 3 is a vertical section of the apparatus illustrated in Fig. 2, taken along line 3—3;

Fig. 4 is a perspective view of a portion of the housing of the temperature responsive element;

Fig. 5 is a perspective view of the indicating mechanism;

Fig. 6 is a vertical cross section of the same taken along the line 6—6 of Fig. 5; and Fig. 7 is another perspective view of the indicating mechanism including a fragmentary view of the dial.

With reference to these drawings, which illustrate the temperature control mechanism of this invention as applied to an automobile, numeral 10 designates the automobile motor, 11 the motor manifold, 12 the carburetor, 13 the vacuum tank and 14 the dash or instrument board upon which the indicating mechanism of the new system is particularly adapted to be mounted, although it may be mounted at any other convenient point on the car. The vacuum tank connections include the customary suction tube 15 from the manifold 11, the gasoline supply line 16 from the fuel tank 17 and the gasoline feed line 18 to the carburetor. In utilizing the new temperature control mechanism the suction tube 15 is preferably tapped near the vacuum tank by attaching thereto another tube 19, in which the same suction is created as exists in tube 15 and vacuum tank 13. As illustrated in Fig. 2, the tube 19 leading from the vacuum tank connects with a small cylinder 20 mounted on a housing 21 which is provided with a suitable bracket for ready attachment to the top of the engine block. In order to ensure the best conduction of heat into the interior of housing 21, that portion of the housing which encloses the bottom and sides thereof, and shown particularly in Fig. 4, may be in direct contact with the engine block. This portion 22 of the housing may be conveniently made in U-shaped cross section with projecting ears 23 which are adapted to be bent over the edges of housing 21 as illustrated in Figs. 2 and 3.

Within housing 21 is mounted a temperature-responsive element 24 which is adapted to flex to an extent proportional to the temperature transmitted thereto by the motor. The free end of temperature-responsive element 24 carries an elongated piston 25 adapted to move in cylinder 20 in accordance with the movements of element 24. Piston 25 is circumferentially channeled to form chambers 26 and 27 and a valve portion 28 between these chambers. Also connecting with cylinder 20 are tubes 29 and 30 arranged on either side of the point of connection of the tube 19 with the cylinder and the arrangement is such that movement of the piston 25 may cause either tube to be connected to tube 19 or tube 19 may be completely shut off. Accordingly, when valve 28 closes the end of the tube 19, communication between tubes 29 and 30 and the vacuum tank 13 ceases while in another position of a valve 28, tube 29 may be shut off and suction tube 19 placed in communication with tube 30 through chamber 26. If the piston is located in the position illustrated in Fig. 2, suction tube 19 communicates with tube 29 through chamber 27.

As shown in Fig. 5, tubes 29 and 30 respectively communicate with a pair of cylinders 31 and 32 formed in a cylinder block 33 which is mounted in a suitable housing 34 adapted to be attached to the dash of the automobile, or mounted on any other portion thereof. Pistons 35 and 36 are slidably mounted in cylinders 31 and 32, respectively, and are each urged toward the bottoms of these cylinders by springs 37, which are held in place by caps 38 tapped into the top ends of the cylinders or else the pistons are held down by their dead weight. The lower ends of pistons 35 and 36 are slotted for the reception of arms 39 and 40, respectively, which project through slots in the sides of cylinder block 33. These arms 39 and 40 are accordingly movable with their respective pistons, and each of them carries a card or screen which is distinctively colored or marked. For example, card 41 mounted on arm 39 may be colored in yellow and green, the lower half being yellow while the upper half is green. Card 42 mounted on arm 40 is preferably colored red and is only half the width of card 41 so that when both cards are in position illustrated in Figs. 5 and 6, only the green portion of card 41 is visible through the window 43 in the indicating dial 44 of housing 34, which screens the remainder of the mechanism within housing 34 from view. While the use of colors on screens 41 and 42 is preferable, any other indicia may be employed, such as the words "Hot," "Warm," "Cold" or the like, only one of the colors or other indications being visible through window 43 at one time.

When the automobile motor is not in operation, no vacuum is created in the vacuum tank 13, so that the indicating mechanism is at rest, and the green card only is visible through window 43, as illustrated in the drawings. As soon as the motor is started, vacuum is created in vacuum tank 13 and tube 19, and as the temperature-responsive element is now in the cold condition, it holds the piston 25 in position with the valve 28 at one side of the opening communicating with the tube 19. This tube is in direct communication with the tube 29 through the chamber 27, so that suction is applied through the line 29 to the piston 35. This piston is drawn upwardly against its spring and causes a movement of the screen 41 to the upper position of the latter in which only the yellow portion is visible through the window 43, thus indicating that the motor is operating below normal working temperature. Meanwhile the motor is becoming warmer and thermostat 24 begins to flex, until at approximately 120 to 140° F., valve 28 is moved opposite the opening of suction tube 19, thereby breaking the suction in tube 29. The weight of the piston 35 with its associated parts and the pressure of spring 37, cause piston 35 to fall, thus bringing the green or upper portion of the screen 41 into view through window 43, thereby indicating that the motor is running properly.

Normally this condition should exist during the entire period of operation of the motor and the green color only should be visible, but frequently, due to insufficient cooling water or oil, or due to other causes, the motor becomes overheated. This abnormal condition is undesirable for apparent reasons, and the operator should be notified accordingly. When the temperature of the motor reaches and exceeds 190° F., the increasing flexure of thermostat 24 causes valve 28 to uncover suction tube 19 so that it is brought into communication with tube 30 and cylinder 32. The suction created in cylinder 32 draws piston 36, arm 40 and red screen 42 upwardly, until the red screen 42 is visible through window 43. This warns the operator that the motor needs water, oil, or other attention. However, after the motor is allowed to cool, or the cause of the overheating has been rectified, for example by replenishing the cooling water, the temperature of the motor will fall to normal and the thermostat 24 will restore the green indication. If the motor is not generating sufficient heat to maintain the efficient operating temperatures, as in cold weather as well as at starting, thermostat 24 will cause the indicator to show yellow.

While the indicating mechanism of this invention has been described as deriving its operating power from the vacuum system, it should be understood that other power means, such as compressed air, oil, water, and the like from any convenient apparatus may be utilized as readily. Furthermore, the mechanism may be applied for indicating temperatures in any apparatus in which the temperature is likely to vary considerably, and may be modified to suit any circumstances of operation and use. It will be seen that the mechanism is simple, efficient and reliable, and that when a device to which it is attached is operating properly, the mechanism is at rest and is only brought into action when undesirable or abnormal thermal conditions exist. Although the mechanism is at rest under some conditions, there are no conditions when indications are not given, so that the operator may be constantly informed as to the thermal condition of the motor or the like at all times.

I claim:

1. In a distant reading temperature indicating mechanism, the combination of a temperature responsive element, indicating means remote therefrom, motive means for operating the indicating mechanism and a source of pressure for driving said means, said source being controlled by said element.

2. In a distant reading temperature indicating mechanism, the combination of a temperature responsive element, indicating means remote therefrom, a source of negative pressure, motive means driven by said pressure for operating the indicating mechanism, and a device controlled by said element for controlling the pressure to said motive means.

3. In a distant reading temperature indicating mechanism, the combination of a temperature responsive element, indicating means remote therefrom, a suction tube connected to said means, the suction therein serving to operate the latter, and a valve actuated by the element to control the suction in the tube.

4. In a distant reading temperature indicating mechanism, the combination of a temperature responsive element, indicating means remote therefrom, a valve moved by movement of the element, and a suction tube connected to the indicating means through said valve, the suction in said tube serving to operate said means.

5. In a distant reading temperature indicating mechanism, the combination of a temperature responsive element, indicating means remote therefrom, said means including a plurality of movable elements, a plurality of suction connections for effecting the movement of the elements and a device actuated by the element for controlling the connections.

6. In a distant reading temperature indicating mechanism, the combination of a temperature responsive element, indicating means remote therefrom, said means including a plurality of movable indicating elements, a source of pressure, connections between the source and the several indicating elements whereby the latter may be operated, and a valve movable by said temperature-responsive element for controlling the said connections.

7. In a distant reading temperature indicating mechanism, the combination of a temperature responsive element, a plurality of movable indicators remote therefrom, a multiple-port valve controlled by the element, a source of pressure connected to the valve, and connections between each of the indicators and the several valve ports, the movements of said element being adapted to actuate the valve to connect one of the ports with the source of pressure to operate a corresponding indicator.

8. In a distant reading temperature indicating mechanism, the combination of a temperature responsive element, a plurality of different temperature indicators movable in parallel planes, a plurality of pressure connections for severally actuating the indicators, and a valve for selectively controlling said connections, said valve being operated by the element according to varying temperatures.

9. In a distant reading temperature indicating mechanism, the combination of a temperature responsive element, a plurality of different indicating devices for different temperatures, a plurality of pressure connections for each of said devices, and means controlled by the element to severally select the connections, said means being inoperative under certain temperature conditions and operative under other temperature conditions.

10. A distant reading temperature indicating mechanism for a heat producing motor, comprising an indicator, an element responsive to temperature developed by the motor, and means for operating the indicator controlled by the element, said means only being operative during abnormal temperatures of the motor.

11. A distant reading temperature indicating mechanism for a heat producing motor, comprising an indicator, a temperature-responsive element exposed to heat developed by the motor, a source of pressure connected to the indicator, the said pressure being effective to operate the indicator, and means controlled by the element for controlling the action of the pressure, the said pressure being effective at abnormal motor temperatures only.

12. A distant reading temperature indicating mechanism for a heat producing motor, comprising an indicator, a temperature-responsive element exposed to the heat developed by the motor, a pressure tube connected to the indicator, and means actuated by the element to shut off said tube from said indicator during normal motor temperatures and vice versa.

13. A distant reading temperature indicating mechanism for an internal combustion engine comprising a thermostatic element mounted to respond to the heat developed by the motor, an indicator remote therefrom, a suction line for operating the indicator, and a valve in said line controlled by the element, said valve only being operative at abnormal engine temperatures.

14. A distant reading temperature indicating mechanism for an internal combustion engine comprising a thermostatic element mounted to respond to the heat developed by the motor, a plurality of movable indicators remote therefrom, a cylinder having a plurality of connections with the indicators, a source of pressure connected to the cylinder, and a piston in the cylinder connected to the element, said piston being movable by the element according to temperature to place certain of said indicators in communication with certain cylinder connections.

15. A distant reading temperature indicating mechanism for an internal combustion engine comprising a thermostatic element mounted to respond to the heat developed by the motor, a plurality of tubes connected to a common source of pressure, a plurality of indicators severally connected to the tubes and adapted to be actuated by the pressure therein, a valve operated by the movement of the element and adapted to alter the communication of the tubes with the source of pressure.

16. In a distant reading temperature indicating device, the combination of a plurality of indicators for indicating different temperatures, each of said indicators having connected therewith actuating means, a source of pressure for operating said indicator-actuating means, a valve for controlling the application of the pressure to said actuating means, and a temperature-responsive device for controlling the action of said valve.

17. In a distant reading temperature indicating device, the combination of a plurality of movable pistons, an indicator connected to each piston, a source of pressure for moving the pistons to bring the indicators into indicating position, a valve for applying pressure selectively to said pistons, and a temperature-responsive element for controlling the operation of said valve.

18. A distant reading temperature indicating device for use with an internal combustion engine which comprises the combination of a thermostatic element exposed to heat generated by said engine, an indicating device remote from said element, a source of pressure developed by said engine during operation, means for connecting the said source to the indicating device for operating the latter, and means actuated by said element in accordance with temperature variations for controlling the action of said pressure.

19. In a motor car the combination of a vacuum tank, a thermostatic element exposed to heat generated by the motor in operation, an indicating device remote from said element, a connection between said device and said tank whereby the vacuum developed in said tank may operate said device, and means controlled by said temperature-responsive element for controlling the effect of said vacuum on said device.

20. In a motor car the combination of an element responsive to the temperature developed by the motor, an indicating device remote therefrom, this device including a part movable to actuate said device, a source of suction generated by said motor while in operation, a connection between said source and the movable part of said device whereby the said part is moved by the suction, and a valve controlled by the temperature-responsive element for controlling the application of suction to the said movable part.

In testimony whereof I affix my signature.

EDWARD L. FONSECA.